UNITED STATES PATENT OFFICE.

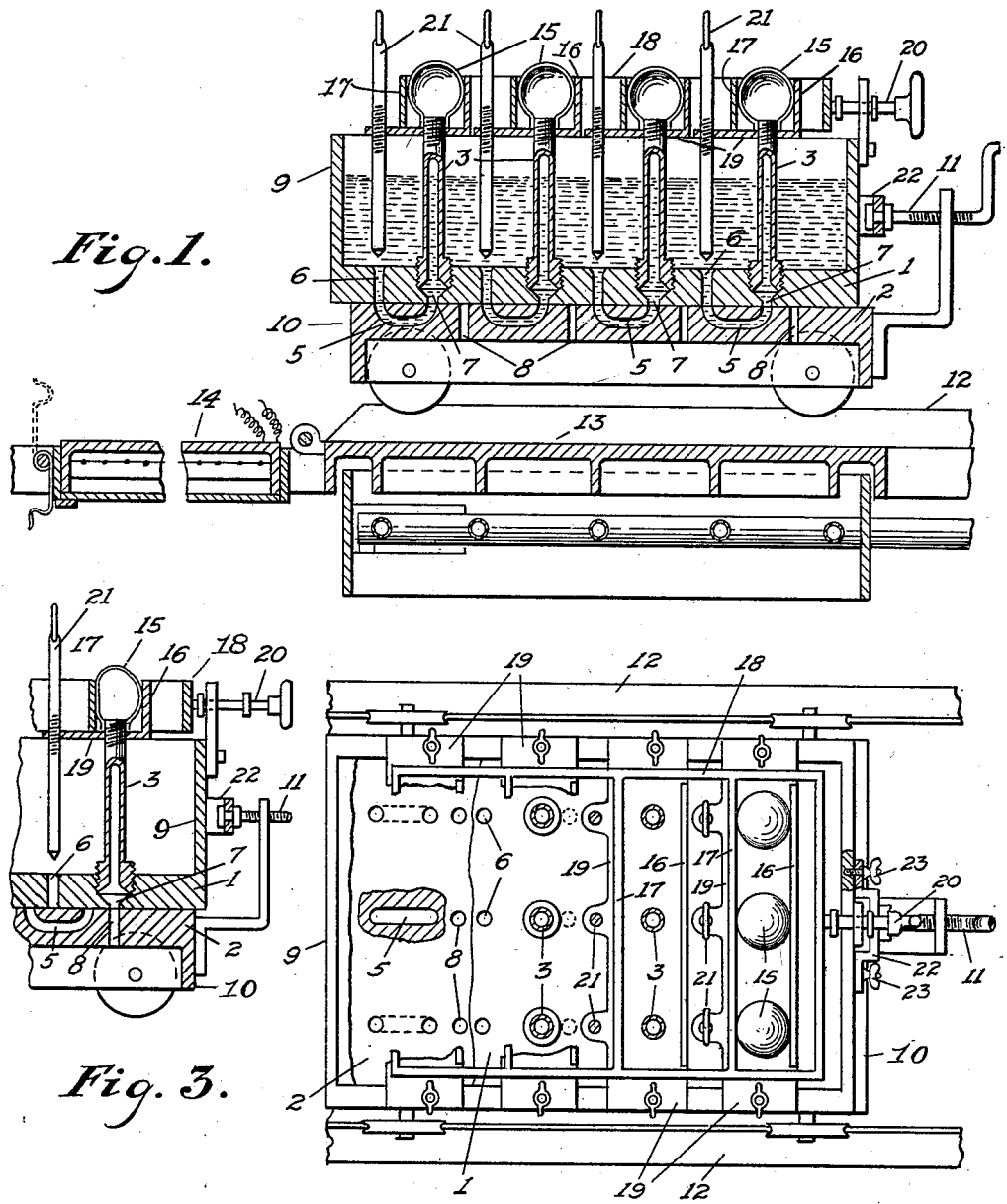

YASUKE KAWASAKI, OF SEATTLE, WASHINGTON.

FEEDING MECHANISM FOR BATTER OR THE LIKE.

999,799.   Specification of Letters Patent.   Patented Aug. 8, 1911.

Application filed December 24, 1909. Serial No. 534,881.

*To all whom it may concern:*

Be it known that I, YASUKE KAWASAKI, a subject of the Emperor of Japan, and a resident of the city of Seattle, in the county of King and State of Washington, have invented certain new and useful Improvements in Feeding Mechanism for Batter or the Like, of which the following is a specification.

My invention relates to mechanisms of the above type, having more particular reference to wafer forming apparatus, and has for its primary object to provide means for obtaining more perfect control of the batter or other material in the feeding thereof.

With the above and other objects in view, to be referred to as my description progresses, my invention resides in the features of construction, arrangements and combination of parts hereinafter described and succinctly defined in my annexed claims.

Referring to the accompanying drawing, wherein like numerals of reference indicate like parts throughout: Figure 1 is a vertical longitudinal section of an apparatus embodying the features of my invention, a portion thereof being broken away. Fig. 2 is a plan view, with parts broken away, illustrating more particularly the supply receptacle and the attendant feed controlling mechanism, and Fig. 3 is a fragmentary vertical section, illustrating an ejector as having been operated to discharge the related receiver.

In carrying out my invention, I provide companion parts 1 and 2, one of which is movable relatively to the other for alternately establishing and cutting off communication between a receiver 3 and source of supply, which communication is normally established through the medium of a feed channel 5 of part 2 extending from an intake 6 of part 1 to an opening 7 thereof, in which latter opening receiver 3 is removably seated as by having threaded engagement therein, as shown. As now considered part 1 is moved to effect this operation, the same also controlling communication between receiver 3 and a discharge opening 8 of part 2, which communication is established subsequently to the cutting off of communication between said receiver and feed channel 5.

For the purpose of illustration, I have shown my present invention applied to an apparatus for forming and baking thin wafer biscuits, in which parts 1 and 2 consist of opposing walls of a supply receptacle 9 and carriage 10 respectively, the former being adjustable on the latter through the medium of a screw 11, and the latter being mounted on a track 12 for movement over a baking iron, comprising the hinged sections 13 and 14, all as shown in my Patent 841,533 dated Jan. 15, 1907. In connection with such an apparatus, it is desirable to equip a series of receivers 3 for simultaneous operation, and with this end in view I arrange the receivers in transverse rows and provide the same with ejecting means consisting of expansible and contractible elastic chambers or bulbs 15, and suitable means for controlling said ejecting means comprising relatively fixed and movable compression members 16 and 17 provided for each row of receivers, the latter of which members are in the form of cross bars of a frame 18, provided with a handle 20 and slidably supported on transverse supporting members 19, of the supply receptacle, which supporting members also carry the fixed compression members 16, as clearly shown in Fig. 1.

In operation, with supply receptacle 9 shifted to the position shown in Fig. 1, frame 18 is moved as described to permit of chambers or bulbs 15 expanding and thereby drawing into the receivers predetermined quantities of material from the supply receptacle. Chamber 9 is then moved to bring openings 7 into registration with their underlying discharge openings 8, after which chambers or bulbs 15 are contracted by proper movement of frame 18 to discharge said receivers.

Reference numeral 21 indicates valves, threaded in supporting members 19, for closing the intake openings 6, when it is desired to clean the contiguous faces of parts 1 and 2, in the accomplishment of which supply receptacle 9, is elevated in any desired manner, from the carriage 10. To permit of this elevating of the supply receptacle, I swivel screw 11 in a bracket 22, which can be detached from the receptacle, the same being secured thereto by thumb screws as 23.

Having thus described my invention, what I claim as new and desire to secure by Letters Patent of the United States of America, is:

1. In mechanism of the character described, a receiver, and superimposed companion parts, the upper thereof being formed with an intake, the lower of said parts being formed with a discharge opening and with a feed channel spaced therefrom and arranged to normally establish communication between said intake and said receiver, one of said parts being movable relatively to the other for cutting off communication between said receiver and the said intake and for establishing communication between said receiver and said discharge opening.

2. In mechanism of the character described, a receiver, superimposed companion parts, the upper thereof being formed with an intake, the lower of said parts being formed with a discharge opening and with a feed channel spaced therefrom and arranged to normally establish communication between said intake and said receiver, one of said parts being movable relatively to the other for cutting off communication between said receiver and the said intake and for establishing communication between said receiver and said discharge opening, and means for ejecting the material from said receiver.

3. In mechanism of the character described, a receiver, superimposed companion parts, the upper thereof being provided with an intake, the lower of said parts being formed with a discharge opening and with a feed channel spaced therefrom and arranged to normally establish communication between said receiver and the said intake, the upper of said parts being movable relatively to the other for cutting off communication between said receiver and the said feed channel and establishing communication between said receiver and said discharge opening, means for shifting said upper part, and means for ejecting the material from said receiver.

4. In mechanism of the character described, a receiver, superimposed companion parts, one of which forms the bottom wall of a supply receptacle, said last named of said companion parts being formed with spaced openings with one of which said receiver is connected, the other of said companion parts being formed with a feed channel normally establishing communication between said openings of the first named part and being provided with a discharge opening bearing a spaced relation to said feed channel, and means for shifting one of said parts relatively to the other for cutting off communication between said feed channel and establishing communication between said receiver and said discharge opening.

5. In mechanism of the character described, a source of supply, a receiver connected therewith, means for controlling communication between said receiver and source of supply, an expansible and contractible member of elastic material for ejecting the material from said receiver, and relatively movable means for exerting pressure on said member for contracting the same.

6. In mechanism of the character described, a source of supply, a receiver connected therewith, means whereby the communication between said source of supply and receiver is cut off, and means for controlling the quantity of material received by said receiver including an expansible and contractible chamber having a wall of flexible material, and relatively movable means for exerting pressure on the wall of said chamber for contracting said chamber.

7. In mechanism of the character described, a source of supply, a plurality of receivers connected therewith, means for controlling communication between said receivers and said source of supply, expansible and contractible material ejecting members each in communication with a respective receiver, a means for operating said members simultaneously comprising companion parts between which said members are engaged, one of said parts being relatively movable for exerting pressure.

8. In mechanism of the character described, a supply receptacle provided with series of spaced openings, means on which said receptacle is slidably mounted formed with a series of feed channels adapted to establish communication between respective pairs of openings of said receptacle, said means being also formed with openings spaced from said feed channels, means for shifting said receptacle to bring one opening of each pair of openings thereof into registration with the openings of said first means, receivers communicating with the said last named openings of said receptacle, and means for ejecting the material from said receivers comprising chambers communicating therewith and having compressible walls, and opposed compression members one of which is supported on said receptacle against movement and the other being relatively movable.

9. A batter feeding mechanism comprising a receiver, superimposed companion parts, one of which forms the bottom wall of a supply receptacle, said last named of said companion parts being formed with spaced openings, said receiver being secured in one of said openings and projecting upwardly therefrom, the other of said companion parts being formed with a feed channel normally establishing communication between said openings of the first named part and being provided with a discharge opening bearing a spaced relation to said feed channel, means for shifting one of said parts relatively to the other, an expansible and contractible ejector mounted on the upper end portion of said receiver and communicating therewith, and companion parts between which said ejector is mounted, one of said last named companion parts being supported for movement toward and from the other for effecting the contraction of said ejector.

Signed at Seattle, Washington, this 16th day of December 1909.

YASUKE KAWASAKI.

Witnesses:
A. A. BOOTH,
ARLITA ADAMS.

Copies of this patent may be obtained for five cents each, by addressing the "Commissioner of Patents, Washington, D. C."